United States Patent [19]
Fischer

[11] 3,958,488
[45] May 25, 1976

[54] EXPANSIBLE ANCHOR

[76] Inventor: Artur Fischer, Altheimer Strasse 219, D-7241 Tumlingen, Germany

[22] Filed: June 11, 1974

[21] Appl. No.: 478,396

[30] Foreign Application Priority Data
- June 15, 1973 Germany............................ 2330538
- June 23, 1973 Germany............................ 2332107

[52] U.S. Cl. .................................... 85/77; 85/70
[51] Int. Cl.² ...................................... F16B 13/06
[58] Field of Search ............... 85/67, 69, 70, 71, 64, 85/77, 78, 79

[56] References Cited
UNITED STATES PATENTS

| | | | |
|---|---|---|---|
| 1,304,065 | 5/1919 | Kennedy | 85/87 |
| 1,908,160 | 5/1933 | McIntosh | 85/69 |
| 2,653,334 | 9/1953 | Bay | 85/71 |
| 3,077,809 | 2/1963 | Harding et al. | 85/69 |
| 3,171,322 | 3/1965 | Kaplan | 85/77 |
| 3,285,311 | 11/1966 | Cushman | 151/7 |
| 3,302,509 | 2/1967 | Modrey | 85/64 |
| 3,480,311 | 11/1969 | Lanham | 151/7 |
| 3,504,498 | 4/1970 | Triplett | 85/70 |
| 3,550,668 | 12/1970 | Coyle | 151/7 |
| 3,851,559 | 12/1974 | Baude | 85/64 |

FOREIGN PATENTS OR APPLICATIONS

| | | | |
|---|---|---|---|
| 842,512 | 5/1970 | Canada | 85/69 |
| 1,218,804 | 6/1966 | Germany | 85/70 |
| 2,058,219 | 6/1971 | Germany | 85/64 |
| 1,199,258 | 6/1959 | France | 87/70 |
| 32,442 | 5/1928 | Netherlands | 85/71 |
| 6,617,436 | 6/1967 | Netherlands | 85/73 |
| 91,510 | 4/1958 | Norway | 85/70 |
| 215,623 | 5/1924 | United Kingdom | 85/87 |
| 866,258 | 4/1961 | United Kingdom | 85/70 |
| 776,249 | 6/1957 | United Kingdom | 85/71 |

Primary Examiner—Roy D. Frazier
Assistant Examiner—Thomas J. Holka
Attorney, Agent, or Firm—Michael J. Striker

[57] ABSTRACT

An expander member has a screw-threaded trailing shaft portion and a leading expander portion which is preferably of one piece with the shaft portion and diverges forwardly from the same. An expansion sleeve slidably surrounds the shaft portion of a part of its length, and an actuating member has a front end and a tapped bore into which the shaft portion is threaded so that, when the actuating member is turned in requisite direction, the front end engages the expansion sleeve and pushes the same onto the expander portion of the expander member.

8 Claims, 4 Drawing Figures

EXPANSIBLE ANCHOR

BACKGROUND OF THE INVENTION

The present invention relates generally to an expansible anchor, and more particularly to an expansible anchor for use in an anchoring hole of a support structure, such as a wall or the like.

Expansible anchors of this general type are well known in the art, and usually have a bolt which extends partly into and partly out of a bore hole and is provided with an engaging portion that can engage any expander member. The bolt is surrounded by an expansion sleeve and when a nut is threaded onto the outer portion of the bolt and moves into abutment with the wall in which the bore hole is formed, it draws the bolt and the expander member outwardly while holding the expansion sleeve in the bore hole, so that the expander member enters into the expansion sleeve and expands the same radially.

These prior-art constructions have certain disadvantages which makes them ill suited for some applications. In particular, the shaft of the bolt which extends out of the bore hole and onto which the nut is threaded, and which also carries an object that is to be secured to the support structure has a relatively small diameter, necessarily smaller than that of the expansion sleeve. This means that this shaft which is relatively weak must be able to withstand the entire bending and shear forces which develop when an object is fixed by means of the expansion anchor to the support structure. In addition, however, the prior-art constructions do not make it possible to simply place the object to be mounted onto the support structure so that a hole in the object registers with the bore in the support structure, or so that both the hole and the bore may even be formed simultaneously, whereupon the expansion sleeve can be introduced and secured. This is very desirable, because it greatly facilitates and speeds up the mounting operation, thus representing a saving in labor cost. The prior-art constructions, however, require that the expansion anchor can be introduced into the bore hole and anchored therein before the object to be mounted can be placed onto the support structure and secured to the bolt of the expansion anchor. This, therefore, requires a larger number of manipulative steps and increases the time required for the mounting operation and, consequently, the labor expenses.

Furthermore, it is known that in the expansion anchors of the prior art the nut which actually effects the outward movement of the bolt and hence the entry of the expander member into the expansion sleeve, must be able to abut the outer surface of the support structure. However, in certain circumstances, for instance if soft and compressible panels of insulating material are provided on the outer surface of the support structure, there is not sufficient resistance to the engagement of the nut to permit the proper expansion of the sleeve, unless the yieldable material is destroyed in the reregion of the bore hole so that the nut can then be threaded against the harder and more resistant material of the support structure itself. This is self-evidently disadvantageous in many respects.

SUMMARY OF THE INVENTION

It is, accordingly, an object of the present invention to provide an improved expansible anchor for use in an anchoring hole of a support structure, which anchor is not possessed of the disadvantages of the prior art.

A further object of the invention is to provide such an improved expansible anchor which advantageously can be made entirely or to a significant extent of metallic material.

Another object of the invention is to provide such an anchor which can be mounted and expanded in the manner outlined above, that is by pushing it through a hole in an object to be mounted and into a bore hole of the support structure, and thereupon expanding it therein without having to remove the object.

An additional object of the invention is to provide such an improved expansible anchor which is particularly resistant to bending and shear forces.

In keeping with the above objects, and with others which will become apparent hereafter, one feature of resides in an expansible anchor for use in an anchoring hole of a support structure which, briefly stated, comprises an expander member having a screw-threaded trailing shaft portion and a leading expander portion on the shaft portion and diverging forwardly from the same. An expansion sleeve slidably surrounds the shaft portion of a part of the length thereof. An actuating member has a front end and a tapped bore into which the shaft portion is threaded and which extends rearwardly from the front end so that, on requisite turning of the actuating member, the front engages the expansion sleeve and effects relative movement of the same and of the expander member, resulting in the entry of the leading expander portion into the sleeve and a consequent expansion of the same.

The expansible anchor according to the present invention is very simple and easy to use. The object to be mounted on a support structure is placed in requisite position against the same, and a hole is formed in the object and subsequently a bore is formed in the support structure. This can be done in a single operation, merely by drilling first through the object and then into the support structure. The hole and the bore must have an inner diameter corresponding to the outer diameter of the expansion anchor sleeve and the shaft portion which latter again advantageously has an outer diameter corresponding to that of the sleeve. The anchor is then inserted full hole into the bore and the shaft portion is turned to thereby draw the expander portion into the sleeve and expand the same, anchoring the entire device in the bore. If the object that is being anchored is of rigid material, then the actuating member can be provided with a screw head which abuts the exposed surface of the object, and in this case the turning of the entire actuating member results in the entry of the expander portion into the sleeve, and at the same time in the pressing of the object by the screw head against the support structure. This has an additional advantage overcoming a problem of the prior art wherein the actuating bolt was drawn farther outwardly as the expansion of the sleeve progressed, and then had a portion projecting outwardly from the support structure and presenting a possible danger of injury; this is avoided in the construction according to the present invention. Moreover, there is now no longer any exposed thread on such an outwardly extending portion, which could be damaged by corrosion or otherwise and prevent subsequent loosening of the device if that was desired.

However, if the object to be supported is of a yielding type, or if for some other reason the screw head on the actuating member is omitted, the device according to the present invention will nevertheless operate as desired, because in this case the expander portion remains stationary and the sleeve is pushed onto it and thereby expanded by the fact that the actuating member abuts the rear end of the sleeve with its own forward end, and pushes the sleeve onto the expander portion. Of course, the actuating member can be made of any desired length so that it can extend out of the bore hole to whatever extent is desired in order to be able to properly mount an object on the support structure. This would include, for instance, the mounting of a cladding panel which is to be secured on the support structure with a certain spacing from the same.

It is a particular advantage of the construction according to the present invention that it is now the larger-diameter actuating member which is subject to torsional stresses, and bending and shear forces, whereas the thinner portion carrying the external screw threads, namely the shaft portion of the expander member, is subject only to tensile stresses which can be more readily withstood.

Since the connection between the shaft portion and the expander portion of the expander member remains established at all times, and since these portions can advantagously be made of one piece with one another, the diameter difference between the largest diameter of the substantially conical expander portion and that of the shaft portion may be relatively small, which means that a relatively large-diameter shaft portion can be used which further increases the resistance of the expansible anchor to damage and malfunction, particularly to pulling-out from the anchoring hole. In fact, to assure that the anchor can be subjected everywhere to equal tensile stress without failure, the shaft portion may be made of a material having greater structural strength than the actuating member. The expansion sleeve itself may be of a wire block spring, advantageously of a relative soft wire, and the expander portion of the expander member may be provided at its forward or leading end with a transversely extending flange having an outer diameter corresponding to the inner diameter of the bore hole. Using a block spring as the expansion sleeve has the advantage that due to its flexibility the spring can accommodate itself to the contour of the bore hole wall, and will already have a certain of frictional engagement with this wall before it is ever expanded. This has the particular advantage that the device cannot turn in the bore hole as it is being expanded, it being evident that this would prevent proper expansion. Moreover, the expansion of such a block spring results only in radial expansion forces being transmitted to the material surrounding the bore hole, so that a danger of crumbling and breaking-out of this material is avoided, even if the forces acting upon the anchor are high and the bore hole is quite short. The flange on the expander portion prevents the latter from being pulled through the expansion sleeve even if high extraction forces acting longitudinally of the device should develop, and on the other hand assures that the greater the extraction forces acting upon the device, the greater will be the expansion of the sleeve.

The trailing end of the sleeve which is remote from the expander portion may be provided with a cap, preferably of synthetic plastic material, which has an annular skirt surrounding the trailing end portion of the sleeve, for instance the several terminal convolutions of the block spring. This results in a slight increase in the outer diameter, since evidently the outer diameter of the skirt must be larger than the outer diameter of the sleeve in order for it to fit over the sleeve, and increases the friction in the bore hole and the retention against undesired turning therein. Moreover, such a cap, especially if it is of synthetic plastic material, can tightly engage the bore hole wall and provide a seal preventing the entry of moisture and its contact with components of the device which are located forwardly or inwardly of the cap.

If desired, at least a portion of that part of the actuating member which extends out of the bore hole can be provided with an exterior screw thread onto which a nut, for instance a cap nut, can be threaded. This makes it possible to use this outwardly extending portion in a simple and inexpensive manner by their means for engaging a tool, such as a wrench, required for turning the actuating member. The nut can be unthreaded after the actuating member has been turned sufficiently to anchor the device, and now the outwardly extending portion of the actuating member is available for mounting an object which can then be prevented from slipping off the outwardly extending portion by threading the cap nut or some other nut back into place.

The tapped bore of the actuating member may be provided in the region of the front end thereof with a radially outwardly extending recess, which facilitates the insertion of the shaft portion into the actuating member and can even be used to reduce the distance to which the actuating member must be threaded onto the shaft portion. Furthermore, a blocking member, for instance of synthetic plastic material such as nylon, can be received in this recess and engage the screw threads on the shaft portion to prevent undesired relative turning of shaft portion and actuating member in a sense causing loosening of the anchoring of the device, for instance as a result of vibrations being transmitted to it. Moreover, this blocking member will also prevent undesired separation of the actuating member from the shaft portion during transport or storage. It may be in form of a ring of synthetic plastic material which frictionally engages the inner wall bounding the recess and the outer surface of the screw threads. If desired, however, this blocking member can also be located at the opposite end of the sleeve, being in this case made of one piece with the aforementioned cap.

The sleeve itself may, if desired, be made of several axially arrayed radially spreadable segments which spread radially as a result of axial compression of the sleeve. Such a construction is partially suitable for use in a support structure of the type composed of cinder blocks of the like having internal hollows. When the sleeve is constructed in this manner, the anchoring force is transmitted to several spaced portions of the support structure, so that the radially exerted anchoring force is not large enough at any one point of the support structure to cause possible damage to the latter. Moreover, such a construction increases the axial extraction forces which the device is capable of withstanding. In such a construction the anchoring of the device results not only from frictional engagement due to the radial expansion, but also from the formation of bulges located in hollow spaces in the interior of such a hollow chamber structure.

The novel features which are considered as characteristic for the invention are set forth in particular in the appended claims. The invention itself, however,

DESCRIPTION OF THE PREFERRED EMBODIMENTS

Figure 1:
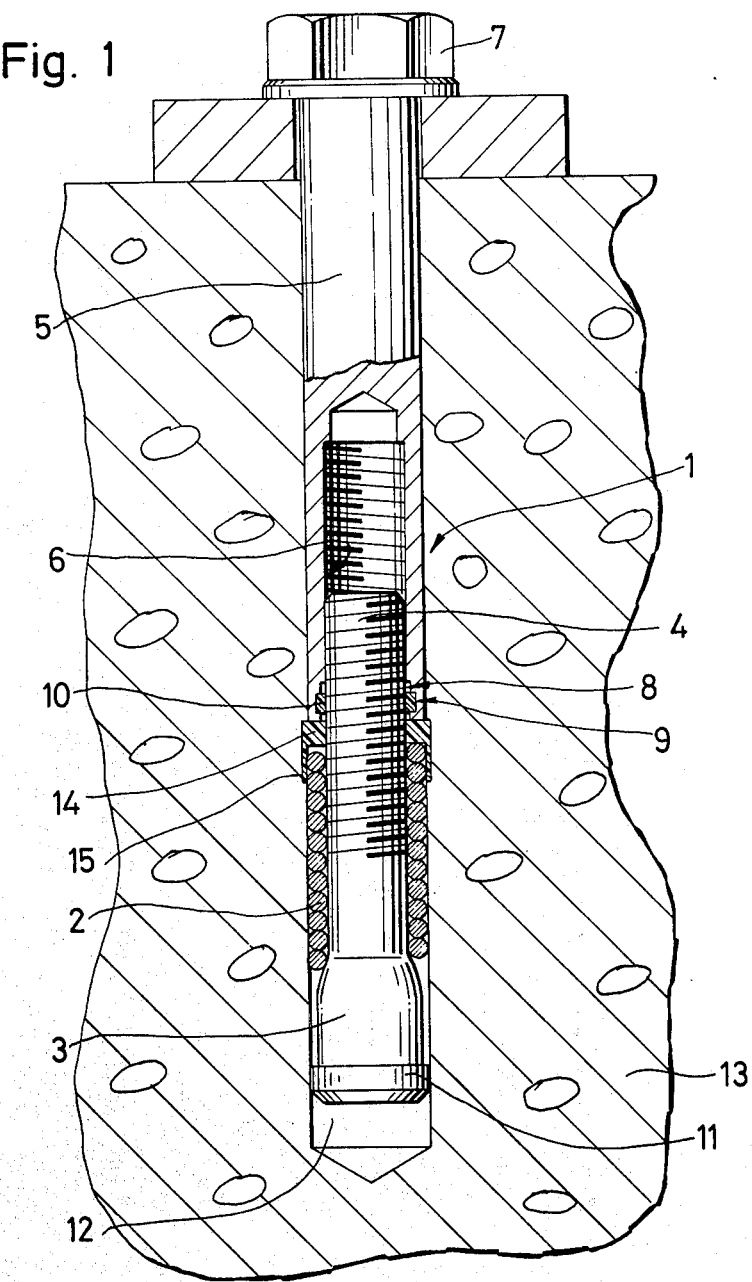
FIG. 1 is a partly sectioned view illustrating one embodiment of the invention.

Referring now firstly to the embodiment in FIG. 1, it will be seen that the expansible anchor 1 as shown in this Figure has an expansion sleeve 2 which is here in form of a wire block spring, and an expander portion 3 of substantially conical configuration which is intended to radially spread the sleeve 2 and anchor it. An exteriorly threaded shaft portion 4 extends outwardly from the expander portion 3 and has an outer diameter corresponding to the smallest diameter of the portion 3. An actuating member 5 having a trapped bore provided with an internal thread 6 can be threaded onto the shaft portion 4; the outer diameter of the actuating member 5 corresponds to the outer diameter of the expansion sleeve 2 in non-expanded condition of the same. The actuating member 5 is provided with means for engagement by a tool serving to turn it, and in the illustrated embodiment this is in form of a hexagonal head 7 which is of one piece with the actuating member 5.

In the region of the forward open end of the bore provided in the actuating member 5, there is formed a recess 8 which facilitates the insertion of the shaft portion 4 into the bore of the actuating member 5. An annular groove 9 of this recess 8 accommodates an elastically yieldable ring 10 of synthetic plastic material, such as nylon or the like, which frictionally engages the screw threads on the shaft portion 4 and thus prevents undesired relative turning of the same and the actuating member 5.

A radially projecting flange 11 is formed on the forward end of the expander portion 3 and has an outer diameter corresponding to the diameter of the bore hole 12 which is formed in the support structure 13, here masonry wall, and it is this flange 11 which prevents the expander portion 3 from being pulled through and extracted from the sleeve 2. A cap 14, preferably of synthetic plastic material, is pushed onto the trailing end of the sleeve 2 and thus provides increased friction with respect to the inner surface bounding the bore hole 12, while at the same time reducing friction between the sleeve 2 and the actuating member 5 and thus permitting easier turning of the latter. Its skirt 15 also serves to seal the bore hole against entry of moisture.

In many prior-art expansion anchors a screw is used which is threaded into the expander portion corresponding to the portion 3. In this case it is possible that if the screw is accidentally turned in the wrong direction, the expander portion becomes disengaged from the screw and cannot be reengaged since access to it through the bore hole is blocked by the presence of the sleeve. This is avoided in the construction according to the present invention, because under all circumstances the connection between the expander portion and the shaft portion remains established in the operation of the novel device. This is, of course, especially true if these portions are of one piece with one another.

Figure 2:
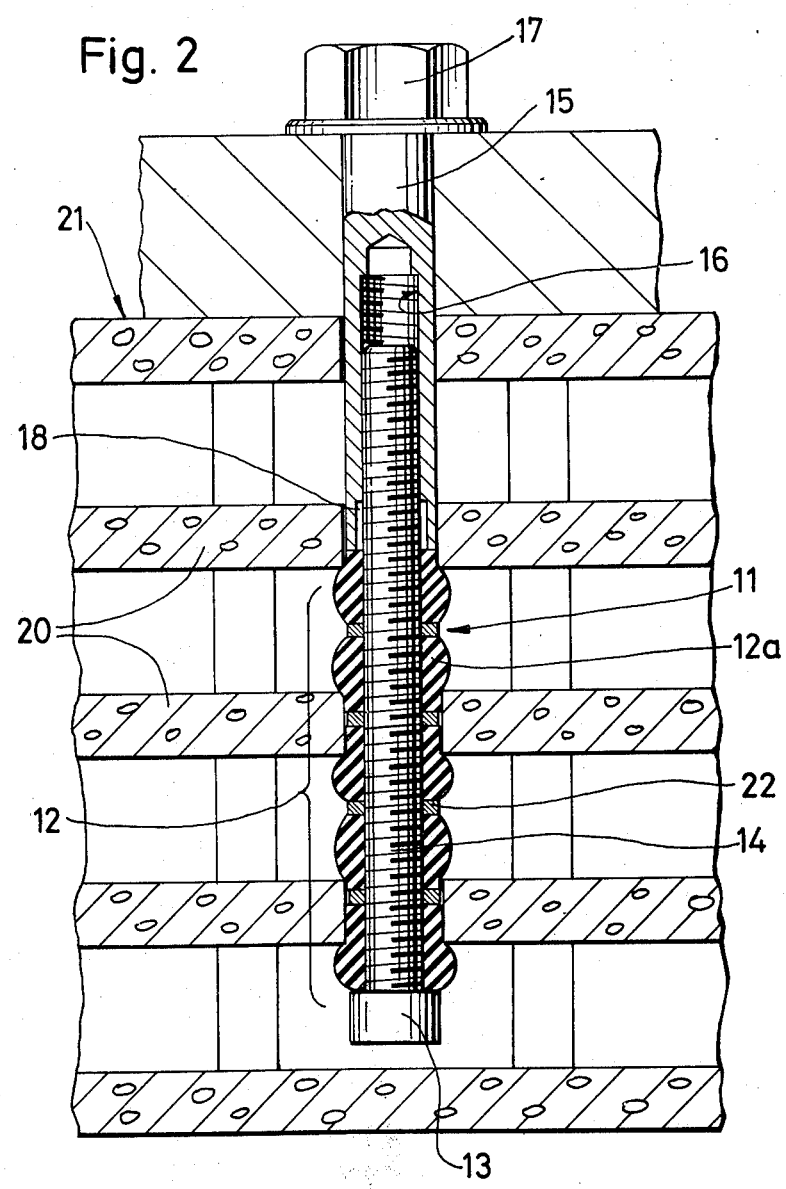
FIG. 2 is a view analogous to FIG. 1, but illustrating a further embodiment of the invention.

FIG. 2 show a further embodiment of the invention wherein the expansible anchor is generally identified with reference numeral 11 and has an expansion sleeve 12 and an expander portion 13 having the shaft 14 that is provided with an external screw thread and onto which the expander member 15 having the internal thead 16 is threaded. The outer diameter of the expander member 15 corresponds to the outer diameter of the sleeve 12 in non-expanded condition. Here, again, the expander member 15 has a hexagonal head 17 which can be engaged by a tool for turning, for instance a wrench.

In this embodiment the sleeve 12 is composed of a plurality of axially arrayed spreading segments 12a, which are radially spreadable in response to axial compression of the sleeve 12, resulting from threading of the actuating member 15 onto the shaft portion 14 towards the expander portion 13. The segments 12a are made, in the embodiment of FIG. 2, of a rubber-like material, for instance natural or synthetic rubber, or synthetic plastic material, which should be resistant to aging, that is which should not become flaccid with age. When the sleeve is subjected to axial compression, the segments 12a expand radially and become anchored in the bore holes of the internal partitions 20 of the hollow chamber structure 21, here a cinder block or the like, forming at the same time bulges intermediate these partitions 20. To more evenly distribute the axial pressure upon the segments 12a, washers or discs 22---preferably of metal--are interposed between them, having a diameter corresponding to the outer diameter of the segments 12a in non-expanded condition. A recess 18 may be provided in the bore of the expander member 15 which facilitates the insertion of the shaft portion 14 into the same.

Figure 3:
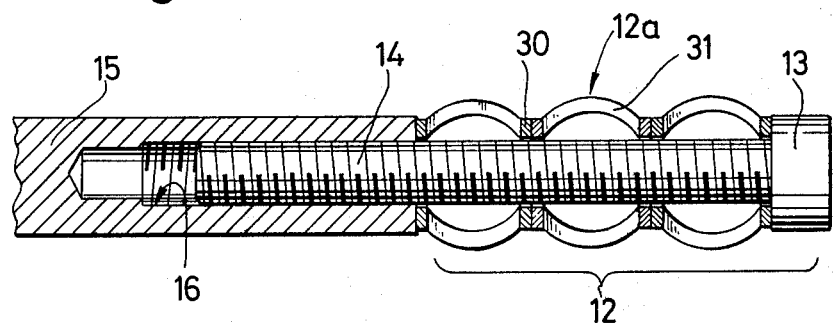
FIG. 3 is an axial section showing a third embodiment of the invention.

The embodiment of FIG. 3 is reminiscent of that of FIG. 2, except that here the spreadable segments 12a are composed of strip-shaped portions 31 the axial ends of which are connected by bushings 30 and which extend in axial parallelism with the longitudinal extension of the shaft portion. In the case of axial compression of the sleeve these strip-shaped portions 31 buckle in radial direction and form the aforementioned bulges again.

Figure 4:
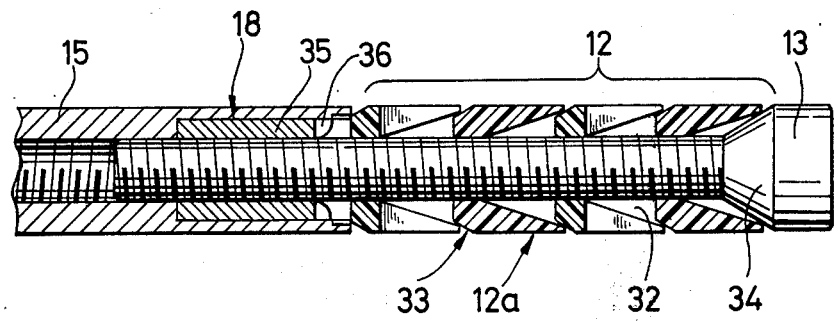
FIG. 4 is a view similar to FIG. 3, but illustrating still another embodiment of the invention.

In FIG. 4 I have illustrated a further embodiment which again is reminiscent of that in FIG. 2, but wherein the segments 12a are configurated as tubular members which are slotted over a part of their length and are each provided with an internal passage which conically converges in one axial direction. The passage is identified with reference numeral 32. When axial compression is exerted upon the sleeve, by relative movement of the actuating member 15 and the expander portion 13 towards one another, the axially adjacent tubular segments 12a enter into the passages 32 of the respectively adjacent segments. Since they are in addition provided with external conical portions 33 which enter these passages 32, they each spread the axially adjacent section 12a in radial direction. A conical portion 34 is formed on the expander portion 13 to assure that even the segments 12a located adjacent the portion 13 will be so spread.

It will be appreciated that in place of internal threads in the actuating member it would also be possible to insert into the recess 18 a sleeve 35 having an external thread, which could be prevented from falling out by bending-over of the abutment portions 36.

The provision of the discs 22 in the embodiment of FIG. 2 prevents the segments 12a from being pushed into or one over the other. Moreover, it aids in uniformly distributing the axial compression over the entire end of the sleeve, thus assuring that all of the segments 12a, particularly those located in the region of the middle of the sleeve, are uniformly expanded to the same extent.

The segments 12a in FIG. 3 could be made of synthetic plastic material, but can equally be readily made of metallic material which makes them especially suitable in certain applications, for instance applications where there is a rarely sufficient heat to constitute a danger of inflamation or melting if synthetic plastic material were used.

The segments 12a in FIG. 4 are advantageously made of synthetic plastic material, and the cones 33 could be omitted, if desired.

It will be understood that each of the elements described above, or two or more together, may also find a useful application in other types of constructions differing from the type described above.

While the invention has been illustrated and described as embodied in an expansible anchor, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An expansible anchor for use in mounting an object in an anchoring hole of a support structure, comprising an expander member having a screw-threaded trailing shaft portion and a leading expander portion diverging forwardly from the same; an expansion sleeve slidably surrounding said shaft portion over part of the length thereof and having a trailing end constituted of metallic material; an actuating member having a front annular end face constituted of metallic material; and a tapped bore into which said shaft portion is threaded, and which extends rearwardly from said front annular end face; and a cap formed of synthetic plastic material having a skirt portion of an outside diameter larger than the diameter of said trailing end of said sleeve so as to surround the latter, and a confined transverse portion extending inwardly of said skirt and surrounding said shaft portion, said transverse portion being located intermediate said metallic material trailing end of said expansion sleeve and said metallic material front annular end face of said actuating member so as to prevent metal-to-metal contact therewith so that, on requisite turning of said actuating member, said front annular end face bears against said transverse portion and via the same upon said trailing end of said expansion sleeve to effect relative movement of the same and of said expander member, thereby resulting in entry of said leading expander portion into said sleeve and consequent expansion of the same.

2. An expansible anchor as defined in claim 1, wherein said shaft portion and said expander portion are of one piece with one another.

3. An expansible anchor as defined in claim 1, wherein said expander portion is at least in part conical; and wherein said actuating member has an outside diameter which is substantially equal to the smallest diameter of said conical part of said expander portion.

4. An expansible anchor as defined in claim 1, wherein said shaft portion is of a material having greater structural strength than the material of said actuating member.

5. An expansible anchor as defined in claim 1, wherein said expansion sleeve is a wire block spring; and wherein said expander portion has a leading end provided with a transversely extending flange having an outer diameter equal to the inner diameter of a hole into which said anchor is to be inserted.

6. An expansible anchor as defined in claim 1, wherein said shaft portion has a rear end which is screw-threaded; and wherein said actuating member includes a nut having said bore and being threaded onto said rear end.

7. An expansible anchor as defined in claim 1, wherein said bore is formed with a recess in the region of said front end.

8. An expansible anchor as defined in claim 7; and further comprising blocking means in said recess for blocking relative turning of said actuating member and shaft portion.

* * * * *